United States Patent [19]

Welker

[11] Patent Number: 5,512,077
[45] Date of Patent: Apr. 30, 1996

[54] TEST APPARATUS AND TESTING METHOD FOR A POSITION SENSOR IN A GLASSWARE FORMING MACHINE

[75] Inventor: Mathias P. Welker, Toledo, Ohio

[73] Assignee: Owens-Brockway Glass Container Inc., Toledo, Ohio

[21] Appl. No.: 250,227

[22] Filed: May 27, 1994

[51] Int. Cl.[6] .................................................. C03B 11/06
[52] U.S. Cl. .......................... 65/29.18; 65/29.12; 65/158; 65/160; 73/1 R; 73/1 J
[58] Field of Search .................................. 65/29.1, 29.11, 65/29.12, 29.18, 158, 164, DIG. 13, 60; 73/1 R, 1 J

[56] References Cited

U.S. PATENT DOCUMENTS

| | | | |
|---|---|---|---|
| 2,289,046 | 7/1942 | Rowe | 49/5 |
| 3,024,571 | 3/1962 | Abbott et al. | 49/37 |
| 3,180,718 | 4/1965 | Wilhelem | 65/158 |
| 3,192,027 | 6/1965 | Wilhelm | 65/158 |
| 3,372,017 | 3/1968 | Pitbladdo | 65/158 X |
| 3,494,199 | 2/1970 | Stacey | 65/158 X |
| 3,539,912 | 11/1970 | Wardle | 324/34 |
| 4,263,803 | 4/1981 | Burkhardt | 73/1 R |
| 4,335,440 | 6/1982 | Gold | 364/571 |
| 4,369,053 | 1/1983 | Becker et al. | 65/164 |
| 4,543,732 | 10/1985 | Maples | 33/502 |
| 4,548,066 | 10/1985 | Martinez et al. | 73/1 J |
| 4,565,008 | 1/1986 | Stölben | 33/172 E |
| 4,613,352 | 9/1986 | Krumme et al. | 65/158 |
| 4,723,977 | 2/1988 | Grant et al. | 65/29 |
| 4,761,608 | 8/1988 | Franklin et al. | 324/202 |
| 4,771,237 | 9/1988 | Daley | 324/202 |
| 4,890,468 | 1/1990 | Frisch et al. | 72/21 |
| 4,942,545 | 7/1990 | Sapia | 364/571.01 |
| 5,038,600 | 8/1991 | Friedman | 73/1 J |
| 5,066,912 | 11/1991 | Kwiatkowski | 324/224 |
| 5,139,559 | 8/1992 | Kozora | 65/158 |
| 5,150,314 | 9/1992 | Garratt et al. | 364/571.02 |
| 5,266,093 | 11/1993 | Konishi et al. | 65/158 |
| 5,318,616 | 1/1994 | Keller | 65/158 |

Primary Examiner—David L. Lacey
Assistant Examiner—Sean Vincent

[57] ABSTRACT

A test apparatus for measuring operating characteristics of a position sensor coupled to a parison mold plunger for glass gob weight control in a press-and-blow individual section glassware manufacturing machine includes circuitry for connection to the sensor to provide a signal as a function of electrical characteristics thereof, a switch network for selecting among a plurality of differing electrical characteristics to be measured, and a display responsive to the sensor signal for displaying the selected and measured electrical characteristic of the sensor to an operator. The measurement circuitry includes a measurement bridge for measuring resistance characteristics of the sensor, and an amplifier circuit for measuring sensor output as a function of position of the plunger. The switch network selectively connects the sensor signal to the measurement bridge and amplifier circuit in differing modes of operation of the test apparatus.

20 Claims, 5 Drawing Sheets

TEST APPARATUS AND TESTING METHOD FOR A POSITION SENSOR IN A GLASSWARE FORMING MACHINE

The present invention is directed to glassware manufacture, and more particularly to an apparatus for testing electrical characteristics of a coil-and-core sensor for gob weight control in a press-and-blow individual section glassware manufacturing machine.

BACKGROUND AND SUMMARY OF THE INVENTION

Glassware is conventionally formed in so-called individual section or IS machines in a process in which a molten glass gob is first preformed in a parison mold, from which it is transferred to a second mold in which it is blown to final shape. In the parison mold, the gob is either blown to parison mold shape forming the so-called blow-and-blow process, or pressed by a plunger into the parison shape forming the so-called press-and-blow process. U.S. Pat. Nos. 2,289,046 and 3,024,571 show IS machines for press-and-blow manufacture of glassware.

As part of the gob weight control system in press-and-blow IS machine glassware manufacture, a sensor is employed to measure plunger travel at the end of the plunging stroke to infer the amount of glass in the parison mold. See, for example, U.S. Pat. Nos. 3,192,027 and 4,369,053. A sensor core of ferromagnetic construction is mounted on the movable plunger piston rod, and cooperates with a fixed sensor coil to supply a signal indicative of final plunger position through a cable to a distribution box, from which the signals from all of the sensors in the various sections of the IS machine are fed to a control computer. For maintenance or trouble-shooting of the sensor and cable, a technician must employ general purpose test equipment, which is suitable primarily only for locating open- or short-circuit conditions, and not for quantitatively measuring electrical characteristics of the sensor or cable, or for measuring operating characteristics such as sensor output as a function of plunger position.

It is therefore a general object of the present invention to provide an apparatus and method for testing the cable and sensor arrangement. A more specific object of the present invention is to provide an apparatus and method of the described character that are inexpensive to manufacture and easy to use, and that are adapted not only to test for open-circuit and short-circuit conditions at the sensor or sensor/cable system, but also to test operating characteristics of the sensor such as sensor output at full stroke of the mold plunger. Another object of the present invention is to provide a test apparatus of the described character that may be readily calibrated by the operator.

A test apparatus for measuring operating characteristics of a position sensor coupled to a parison mold plunger for glass gob weight control in a press-and-blow individual section glassware manufacturing machine in accordance with the present invention includes circuitry for connection to the sensor to provide a signal as a function of electrical characteristics thereof, a switch network for selecting among a plurality of differing electrical characteristics to be measured, and a display responsive to the sensor signal for displaying the selected and measured electrical characteristic of the sensor to an operator. The measurement circuitry includes a measurement bridge for measuring resistance characteristics of the sensor, and an amplifier circuit for measuring sensor output as a function of position of the plunger. The switch network selectively connects the sensor signal to the measurement bridge and amplifier circuit in differing modes of operation of the test apparatus.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
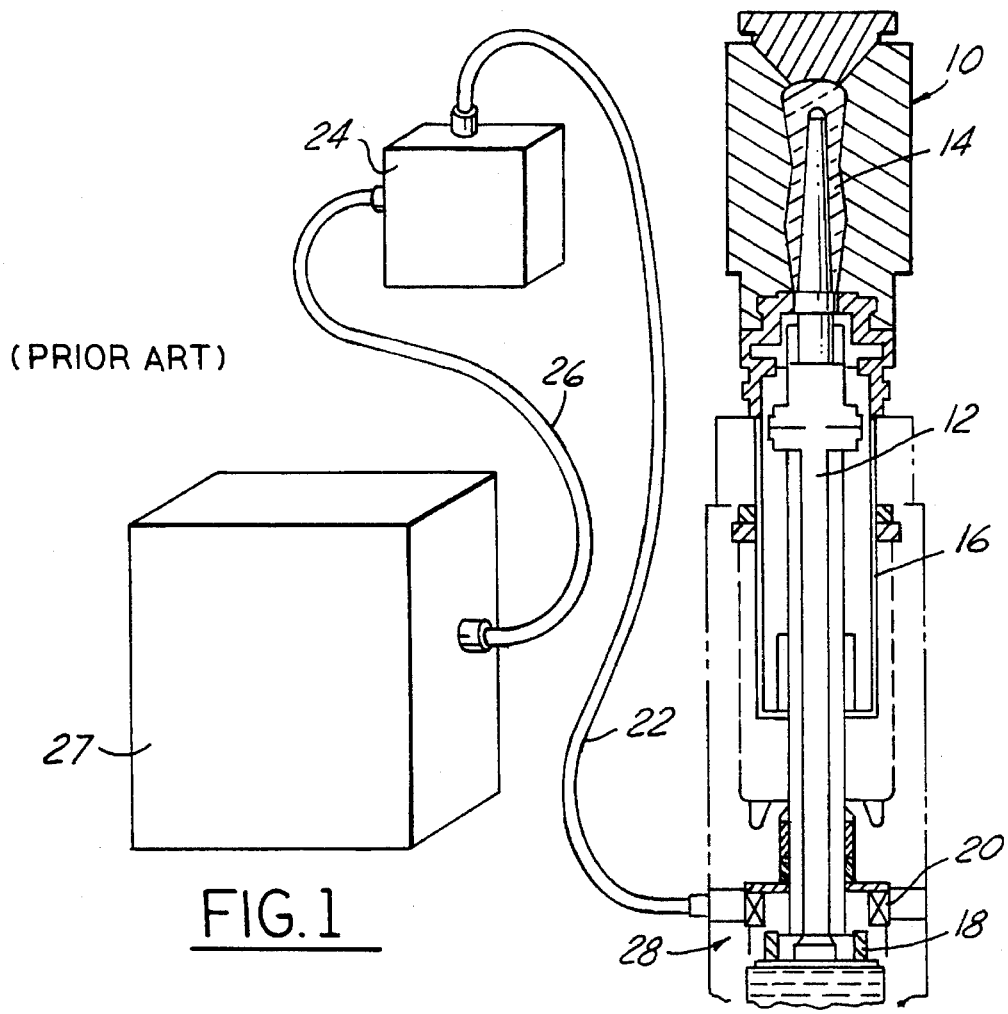
FIG. 1 is a fragmentary schematic diagram of a conventional parison mold plunger coil/core sensor arrangement.

FIG. 1 illustrates a multiple-section parison mold 10 in which a plunger piston rod 12 presses a glass gob 14 so as to urge the gob to conform to the outline of the parison mold. Plunger 14 is slidably captured within a cylinder 16, and is operated in a conventional manner by pneumatics responsive to timing and control signals for operation of the IS machine. A ferromagnetic core 18 is mounted on rod 12, and cooperates with a coil 20 fixedly carried by cylinder 16 for generating an electrical signal as a function of core/plunger position. This signal is fed by a cable 22 to a junction box 24, and thence by a cable 26 to a distribution box 27. Distribution box 28 is connected by multiple additional cables 26 to other junction boxes and coil/core sensors 28 of other machine sections for gathering corresponding additional plunger position information, and feeding such information to a central IS machine control computer. The present invention is directed to an apparatus for testing electrical characteristics of sensor 28 comprising core 18 and coil 20, either directly, through cable 22, or through cables 26, 22 and junction box 24.

Figure 2:
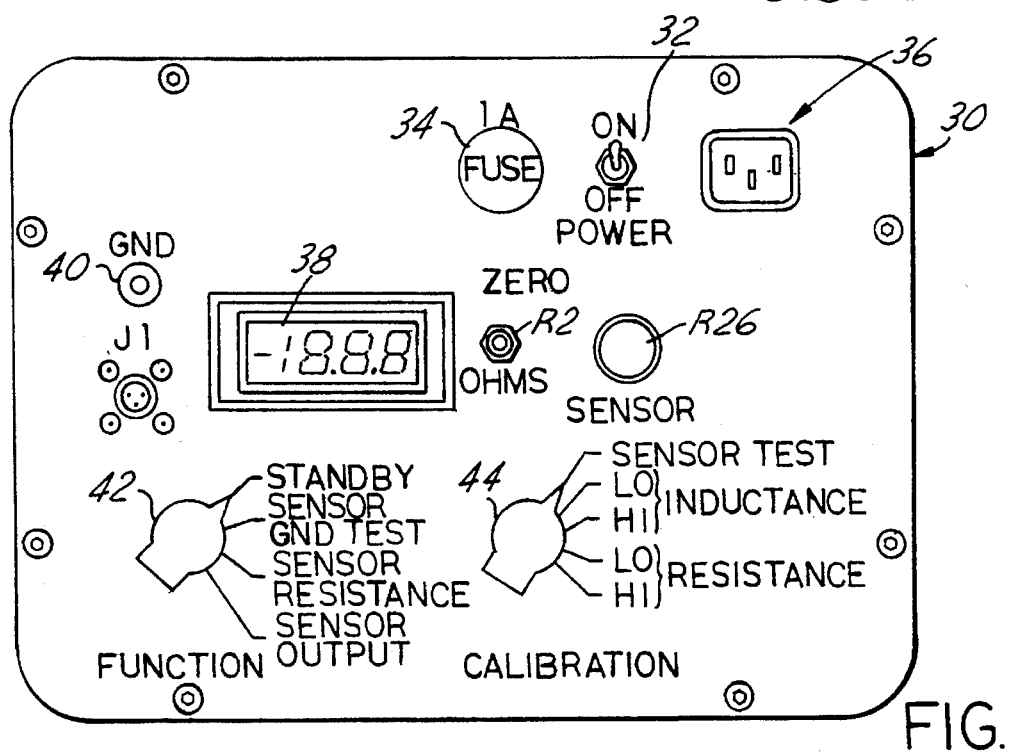
FIG. 2 is an elevational view of the operator panel of a test apparatus in accordance with a presently preferred embodiment of the invention.

FIG. 2 illustrates the operator panel 30 of the test apparatus in accordance with a presently preferred embodiment of the invention. An on/off toggle switch 32 applies electrical power through a fuse 34 to the internal components of the test apparatus from a socket 36 on panel 30. A multiple-segment numeric display 38 provides information to an apparatus operator. A three-contact connector J1 provides for connection to a sensor 28 (FIGS. 1 and 3) for test, either directly through a test cable, or through cable 22, or through cables 26, 22 and junction box 24. A single-contact connector 40 provides for connection to chassis ground. A pair of rotary switches 42, 44 allow operator selection of mode of operation, as will be described. A pair of variable resistors R2 and R26 are accessible at the control panel for providing zero output adjustment during instrument calibration, as will also be described.

Figure 3:
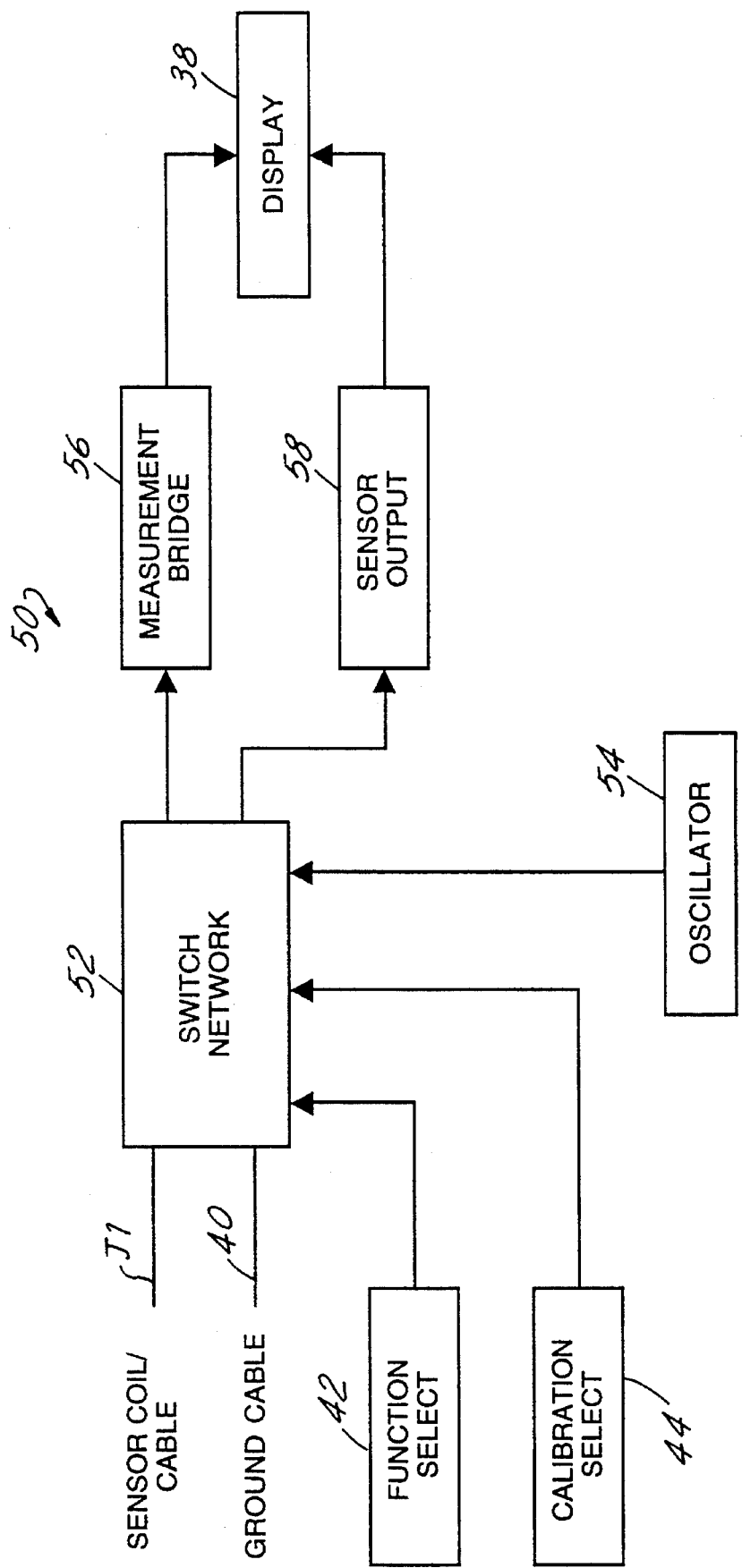
FIG. 3 is a functional block diagram of the test apparatus in accordance with the presently preferred embodiment of the invention.

FIG. 3 is a functional block diagram of the test apparatus 50 in accordance with the presently preferred embodiment of the invention. An electronic switch network 52 provides signal connection to and from the sensor coil/cable by means of connector J1 (FIG. 2) and the ground cable by means of connector 40. Switch network 52 also receives control inputs from FUNCTION select rotary switch 42 (FIGS. 2 and 3) and CALIBRATION rotary switch 44. An oscillator 54 is connectable to the sensor coil by switch network 52 for applying an excitation signal thereto during modes of operation that call for testing of the sensor operating characteristics. Switch network 52 couples the sensor signal in differing modes of operation to a measurement bridge 56 for measuring electrical resistance characteristics of the sensor, and to a sensor output amplifier arrangement 58 for measuring sensor output as a function of plunger position. Measurement bridge 56 and sensor output amplifier 58 are connected to display 38 (FIGS. 2 and 3) to indicate measured characteristics to an operator.

Figure 4A:
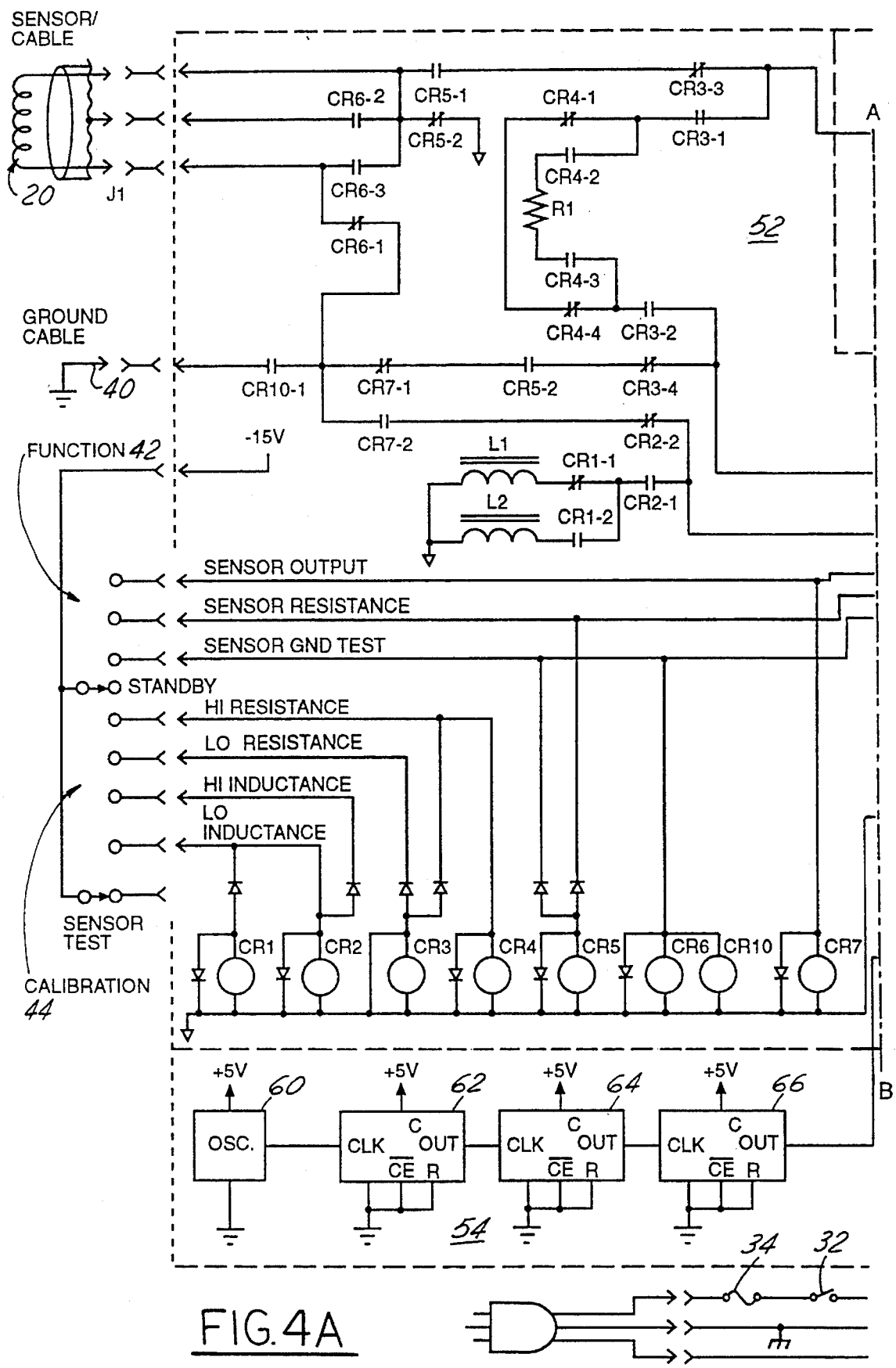
FIGS. 4A, 4B and 4C together comprise an electrical schematic diagram of the test apparatus illustrated functionally in FIG. 3.
Figure 4B:
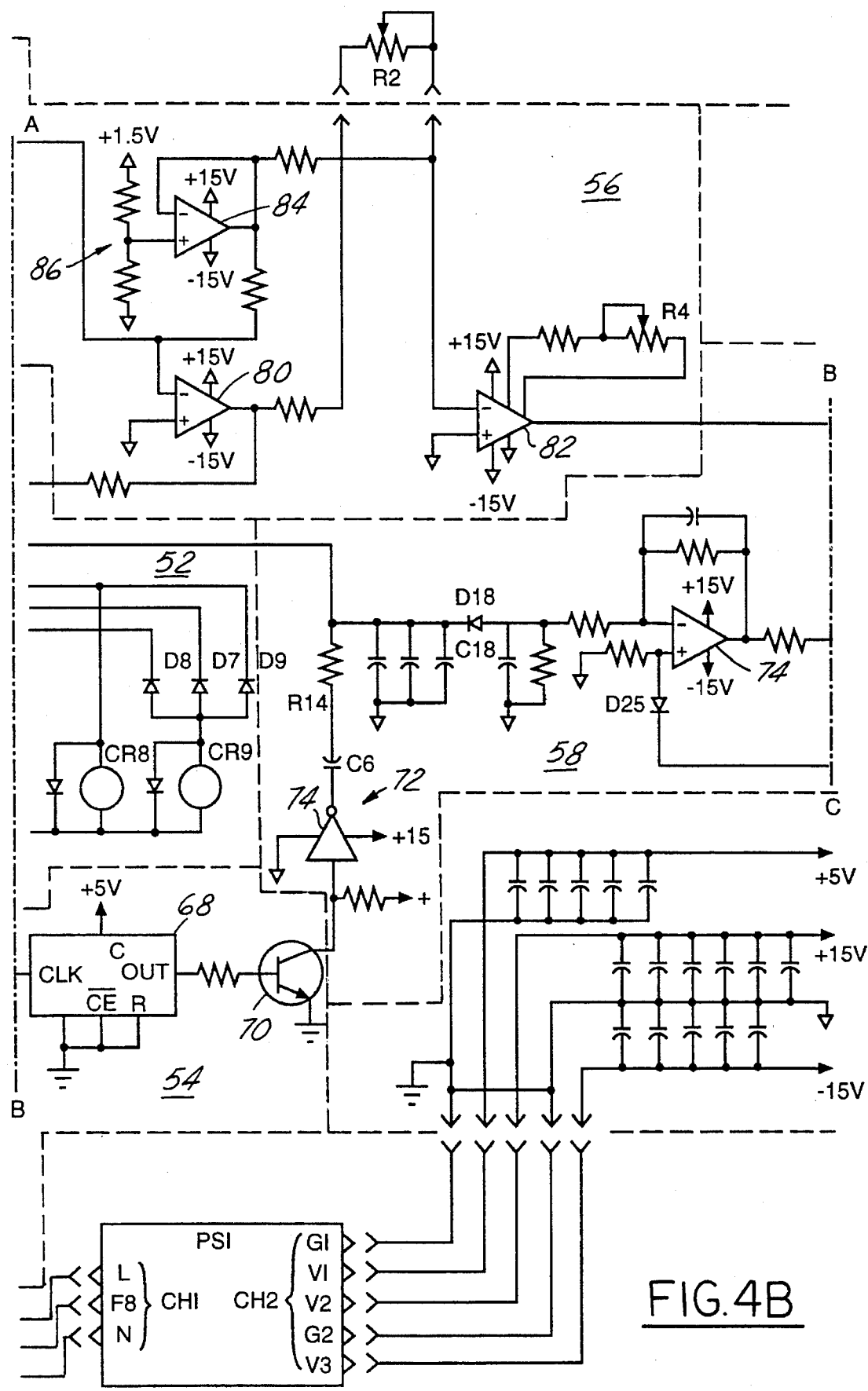
Figure 4C:
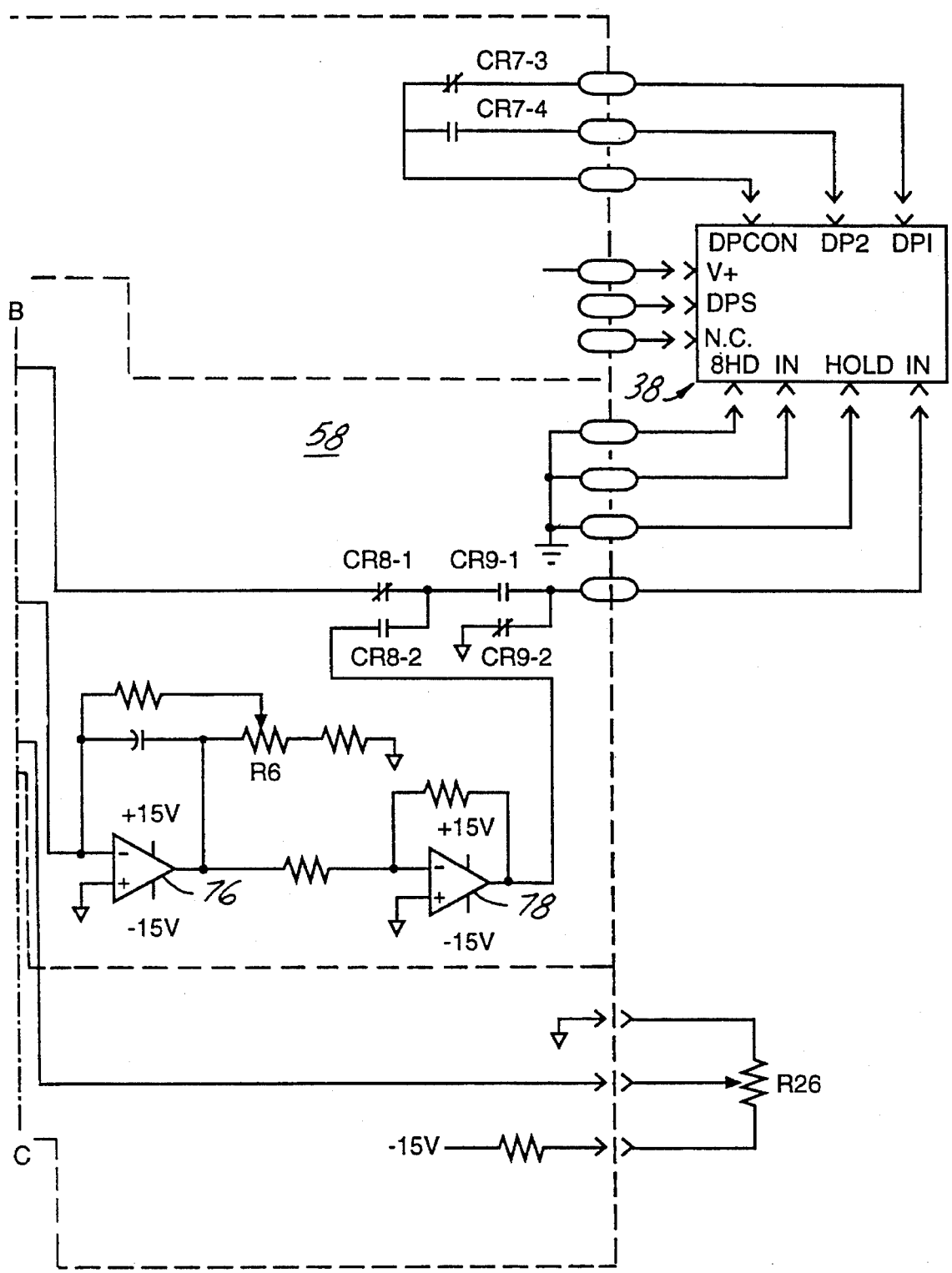

FIGS. 4A, 4B and 4C, interconnected along the lines A-B in FIGS. 4A and 4B and B–C in FIGS. 4B and 4C, together constitute an electrical schematic diagram of apparatus 50 illustrated functionally in FIG. 3. Reference numerals and characters identical to those employed hereinabove in connection with FIGS. 2 and 3 illustrate correspondingly identical elements in FIGS. 4A–4C. Oscillator 54 (FIGS. 3 and 4A) comprises a high frequency oscillator chip 60 connected through a series of dividers 62, 64, 66 and 68 (FIG. 4B) to an output transistor 70. Transistor 70 drives a differentiator 72 that includes an amplifier 74, a capacitor C6, a resistor R14, and the impedance of the sensor coil 20 (FIGS. 1 and 4A) when the coil is connected to differentiator 72 by switch network 52 (FIGS. 3, 4A and 4B). The output of differentiator 72 is connected through a diode D18 to provide across a capacitor C18 a dc signal at an amplitude that varies as a function of the amplitude of the differentiator/sensor signal. Capacitor C18 is connected to one input of an amplifier 74, which receives an offset input from operator variable resistor R26 (FIGS. 2 and 4C). The output of amplifier 74 (FIG. 4B) is fed through a pair of amplifiers 76, 78 (FIG. 4C), which thus provides a d.c. output indicative of amplitude of the sensor signal. The gain of amplifier stage 76 is adjustable by means of a resistor R6, as will be described.

Measurement bridge circuit 56 (FIGS. 3 and 4B) includes an amplifier 80 that receives an input from sensor 20 and ground cable 40 (FIGS. 3 and 4A) through switch network 52. The output of amplifier 80 is connected through operator variable resistor 82 to a summing junction at the input of an amplifier 82 (FIG. 4B), which receives a second input from a reference amplifier 84 and a precision voltage divider 86. The gain of amplifier 82 is adjustable by means of a resistor R4. The output of amplifier 82 is connected to display 38 (FIGS. 3 and 4C). Switch network 52 (FIGS. 3 and 4A–4C) comprises a series of relays and relay contacts for selectively interconnecting the various other apparatus components, as will be described hereinafter in connection with the various modes of operation.

In a first mode of operation for calibrating the test apparatus for measuring resistance characteristics of sensor coil 20, FUNCTION switch 42 is set to the SENSOR RESISTANCE position so as to activate relay coils CR5 (FIG. 4A) and CR9 (FIG. 4B), and CALIBRATION switch 44 is set to the LO RESISTANCE position so as to activate relay coil CR3. The input of bridge amplifier 80 is thereby effectively short circuited through relay contacts CR3-1, CR4-1, CR4-4 and CR3-2 (FIG. 4A). The output of amplifier 82 is connected to display 38 through relay contacts CR8-1 and CR9-1 (FIG. 4C). The operator then adjusts variable resistor R2 (FIG. 4B) until "00.0" is indicated at display 38. The operator then positions CALIBRATION switch 44 in the HI RESISTANCE position while leaving FUNCTION switch 42 in the SENSOR RESISTANCE position. Such repositioning of CALIBRATION switch 44 activates relay coil CR4, in addition to relay coils CR3, CR5 and CR9. The input to amplifier 80 is thus connected to a precision calibration resistor R1 (FIG. 4A) through relay contacts CR3-1, CR4-2, CR4-3 and CR3-2. Resistor R4 (FIG. 4B) is now varied to adjust the span of measurement bridge 56, until display 38 indicates the calibration maximum value of the apparatus—i.e., the value of resistor R1. In the preferred embodiment of the invention, resistor R1 has a value of 20.0 ohms.

In a second mode of operation for calibrating the test apparatus to measure output of the sensor, FUNCTION switch 42 is switched to the SENSOR OUTPUT position so as to energize relay coils CR7, CR8 and CR9, and CALIBRATION switch 44 is switched to the LO INDUCTANCE position so as to activate relay coil CR2. Differentiator 72 and diode D18 (FIG. 4B) are thereby connected to a low impedance precision inductor L1 (FIG. 4A) through relay contacts CR2-1 and CR1-1. The output of amplifier 78 (FIG. 4C) is connected to display 38 through relay contacts CR8-2 and CR9-1. Resistor R26 (FIGS. 2 and 4C) is then adjusted so as to vary the offset of amplifier 74 (FIG. 4B) until display 38 reads "00.0". CALIBRATION switch 44 is then moved to the HI INDUCTANCE position so as to activate relay coil CR1 in addition to coils CR2, CR7, CR8 and CR9. In this position, differentiator 72 and diode D18 are connected to a high impedance precision inductor L2 (FIG. 4A) through relay contacts CR2-1 and CR1-2. The sensor output measurement span is then adjusted by variation of resistor R6 (FIG. 4C) until display 38 reads the desired calibration value corresponding to the maximum coil output voltage. Typically, such calibration value will be on the order of 11.00 volts. With the instrument so calibrated, it is now ready for use in measuring electrical characteristics of a coil 20 and ground cable 40 (FIG. 4A).

In a third mode of operation for measuring resistance characteristics of the sensor, CALIBRATION switch 44 is placed in SENSOR TEST, and FUNCTION switch 42 is placed in the SENSOR RESISTANCE position so as to energize relay coils CR5 (FIG. 4A) and CR9 (FIG. 4B). The input of bridge amplifier 80 (FIG. 4B) is now connected to coil 20 (FIG. 4A) through relay contacts CR3-3, CR5-1, CR6-1, CR7-1, CR5-2 and CR3-4. With the zero and span adjustments of measurement bridge 56 calibrated as described above, the resistance of the sensor coil is now measured and fed from bridge 56 to display 38 through relay contacts CR8-1 and CR9-1 (FIG. 4C).

In a fourth mode of operation for measuring output of sensor coil 20 as a function of plunger position, CALIBRATION switch 44 is left in the SENSOR TEST position, and FUNCTION switch 44 is now placed in the SENSOR OUTPUT position so as to activate relay coils CR7, CR8 and CR9 (FIGS. 4A and 4B). The junction of differentiator 72 and diode D18 is thus connected to sensor coil 20 through relay contacts CR2-2, CR7-2, CR6-1 and CR5-2. With the zero and span adjustments calibrated in sensor output amplifier 58 as previously described, the sensor output signal is fed to display 38 through relay contacts CR8-2 and CR9-1 to indicate plunger position at the display. When the plunger is moved to the fully inserted position with no glass in the parison mold, or when testing the plunger cylinder outside of the machine, the digital display should thus indicate the maximum sensor output signal, typically on the order of 6.00 or higher.

In a fifth mode of operation for performing a sensor ground test, CALIBRATE switch 44 remains in the SEN- SOR TEST position, and FUNCTION test switch 42 is placed in the SENSOR GND TEST position so as to activate relay coils CR5, CR6, CR9 and CR10. The input to bridge amplifier 80 is thus connected through relay contacts CR3-4, CR5-2, CR7-1 and CR10-1 to ground cable 40, and through contacts CR3-3, CR5-1, CR6-2 and CR6-3 to sensor coil 20 and its shield. As long as coil 20 is not short circuited to ground, the output of bridge 56 to display 38 through relay contacts CR8-1 and CR9-1 should be at infinity.

There has thus been disclosed a test apparatus that fully achieves all of the objects and aims previously set forth. It will be appreciated that, in addition to testing electrical characteristics of coil 20 directly as hereinabove described, the apparatus of the invention may be employed for testing the sensor connection cables 22 and 26 as well. For example, the test apparatus of the invention may be connected to sensor 28 through cable 22, in which event the sensor output test and sensor ground test will be as previously described, while the sensor resistance test will additionally include the resistance of interconnection cable 22. In the same way, the test apparatus may be connected to sensor 28 through cable 26, junction box 24 and cable 22, in which event the sensor resistance test will include the resistance of both cables as well as the junction box. Thus, an open circuit or short circuit condition may be readily located in either cable or in the junction box.

I claim:

1. The combination of a test apparatus coupled to a position sensor for measuring operating characteristics of said position sensor coupled to a parison mold plunger in a press-and-blow individual section glassware manufacturing machine, said apparatus comprising:

means for connection to said sensor to provide a signal as a function of electrical characteristics thereof, means operatively coupled to said connection means for selecting among a plurality of differing electrical characteristics to be measured, and means responsive to said signal for displaying measured electrical characteristics of said sensor to an operator, said means for selecting among said characteristics comprising first circuit means for measuring resistance characteristics of said sensor, second circuit means for measuring sensor output as a function of position of said plunger, and switch means responsive to the operator for selectively connecting said connection means and the sensor connected to said connection means to said first and second circuit means.

2. The combination set forth in claim 1 wherein said sensor comprises a core of magnetically permeable material coupled to said plunger and a coil electromagnetically coupled to said core, and wherein said plurality of differing electrical characteristics include-coil resistance.

3. The combination set forth in claim 2 wherein said plurality of differing electrical characteristics further include short circuit at said sensor coil.

4. The combination set forth in claim 3 wherein said position sensor is connected to a cable for coupling to control means to operate said machine, and wherein said means for connection to said sensor includes said cable such that said apparatus measures operating characteristics of said cable as well as said sensor.

5. The combination set forth in claim 2 further comprising means for displaying output of said sensor at zero position and full-stroke position of said plunger.

6. The combination set forth in claim 1 further comprising means for calibrating said apparatus.

7. The combination set forth in claim 1 wherein said switch means also includes means for selectively connecting said first and second circuit means to said means for displaying said electrical characteristics.

8. The combination set forth in claim 1 further comprising an oscillator connected to said switch means for selective connection to said sensor by said switch means to measure said sensor output as a function of position of said plunger.

9. The combination set forth in claim 1 wherein said first circuit means includes means for calibrating said first circuit means to zero and high resistance characteristics of said sensor.

10. The combination set forth in claim 9 wherein said first circuit means comprises measurement bridge circuit means having resistance reference means in a first bridge arm and said sensor in a second bridge arm, said means for calibrating said zero resistance characteristic of said sensor comprising zero calibration resistance means disposed in one of said first and second arms.

11. The combination set forth in claim 10 wherein said measurement bridge circuit means further includes an amplifier coupled to said first and second bridge arms, said means for calibrating said high resistance characteristics of said sensor comprising means for adjusting gain of said amplifier.

12. The combination set forth in claim 1 wherein said second circuit means includes means for calibrating said second circuit means to inductance characteristics of said sensor.

13. The combination set forth in claim 12 wherein said second circuit means comprises amplifier circuit means, and wherein said means for calibrating said second circuit means comprises means for adjusting gain and offset of said amplifier circuit means.

14. The combination set forth in claim 1 wherein said switch means includes means responsive to the operator for selecting among a first mode of operation for calibrating said first circuit means for measuring resistance characteristics of said sensor, a second mode of operation for calibrating said second circuit means for measuring output of said sensor, a third mode of operation for operating said first circuit means to measure resistance characteristics of said sensor, and a fourth mode of operation for operating said second circuit means to measure output of said sensor.

15. The combination set forth in claim 14 wherein said switch means further includes means responsive to the operator for selecting a fifth mode of operation for determining whether said sensor is short circuited to ground.

16. A glassware manufacturing apparatus comprising a press-and-blow glassware manufacturing machine having a parison mold plunger with a core of magnetically permeable material and a coil electromagnetically coupled to said core, and means for connection to said coil and operable in differing modes of operation to measure electrical resistance of said coil, short circuit of said coil to ground, and output of said coil as a function of position of said plunger and said core.

17. The apparatus set forth in claim 16 wherein said means for connection to said coil is operable in additional differing modes of operation for calibrating said means to measure electrical resistance of said coil and output of said coil as a function of plunger position.

18. The apparatus set forth in claim 17 further including cable means for connecting said coil to means for controlling operation of said machine, said means for connection to said coil including said cable means.

19. A method of measuring operating characteristics of a parison mold plunger position sensor in a press-and-blow individual section glassware manufacturing machine, comprising the steps of:

(a) connecting said sensor to a test apparatus having multiple modes of operation, (b) operating said test apparatus in a first mode to measure and display electrical resistance of said sensor, (c) operating said test apparatus in a second mode to measure and display output of said sensor as a function of plunger position, and (d) operating said test apparatus in a third mode to measure and display resistance between said sensor and electrical ground.

20. The method set forth in claim 19 comprising the additional step of: (e) operating said test apparatus in a fourth mode of operation to calibrate said first and second modes.

* * * * *